United States Patent [19]

Christenson et al.

[11] 4,065,415
[45] Dec. 27, 1977

[54] WATER-BASED COATINGS WITH IMPROVED SAGGING AND POPPING CHARACTERISTICS

[75] Inventors: Roger M. Christenson, Gibsonia, Pa.; Clarence E. Evjen, Williston, N. Dak.

[73] Assignee: PPG Industries, Inc., Pittsburgh, Pa.

[21] Appl. No.: 618,582

[22] Filed: Oct. 1, 1975

[51] Int. Cl.$^2$ ............................................. C08L 33/02
[52] U.S. Cl. ........................... 260/17.4 SG; 260/29.3; 260/29.4 UA; 260/29.6 NR; 260/29.6 TA; 260/29.6 E
[58] Field of Search ...... 260/29.3, 29.4 UA, 29.6 NR, 260/29.6 TA, 29.6 E, 17.4 SG

[56] References Cited

U.S. PATENT DOCUMENTS

| | | | |
|---|---|---|---|
| 3,081,278 | 3/1963 | Wohnsiedler | 260/29.6 NR |
| 3,085,085 | 4/1963 | Wismer et al. | 260/209 |
| 3,288,740 | 11/1966 | Maeder et al. | 260/29.6 TA |
| 3,403,088 | 9/1968 | Hart | 260/29.4 UA |
| 3,652,478 | 3/1972 | Ishii et al. | 260/29.4 UA |
| 3,772,227 | 11/1973 | Kapalko et al. | 260/29.3 |
| 3,860,549 | 1/1975 | Sekmakas | 260/29.6 TA |
| 3,926,888 | 12/1975 | Cheung et al. | 260/29.4 UA |
| 3,937,679 | 2/1976 | Bosso et al. | 260/29.4 UA |
| 3,959,202 | 5/1976 | Blank | 260/29.4 UA |

Primary Examiner—M. J. Welsh
Attorney, Agent, or Firm—Frank J. Troy; Charles R. Wilson

[57] ABSTRACT

This invention relates to a water-based coating composition in which solvent or water popping and sagging are eliminated or substantially reduced. The composition comprises a thermosetting, film-forming organic binder dispersed in an aqueous medium containing from 60 to 100 parts by weight of water and 0 to 40 parts by weight of a volatile organic solvent. The organic binder is formulated from (a) and acid-containing interpolymer adapted to be dissolved or dispersed in water with the acid of a base; (b) a water-soluble or water-dispersible polyether polyol or polyester polyol having a molecular weight of at least 300 and (c) a water-soluble or water-dispersible aldehyde condensation resin. The interpolymer consists essentially of a carboxylic acid amide in units of the structure:

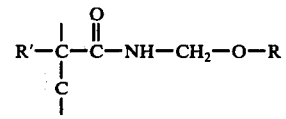

wherein R' is hydrogen or lower alkyl and R is lower alkyl; an alpha, beta-ethylenically unsaturated carboxylic acid; and at least one other monomer containing a $CH_2=C<$ group.

In addition to the elimination of, or substantial reduction in solvent or water popping and sagging of the composition, films formed from the compositions exhibit excellent properties, such as hardness, water resistance, salt spray resistance and stain resistance.

12 Claims, No Drawings

WATER-BASED COATINGS WITH IMPROVED SAGGING AND POPPING CHARACTERISTICS

BACKGROUND OF THE INVENTION

In recent times, the increased emphasis on environmental pollution problems has affected all areas of society. In the coatings industry, this emphasis has taken the form of a major effort to eliminate or substantially reduce organic solvent emissions from coating compositions. This has led to an increasing interest on the part of the coatings industry in water-based coatings in which organic solvents are eliminated or at least greatly reduced. In even more recent times, this interest in water-based coatings has received added impetus as a result of the energy shortage, particularly the decline in U.S. oil production and the high cost of imported oil.

Water-based coating compositions derived from interpolymers of substituted, unsaturated carboxylic acid amides, alpha, beta-ethylenically unsaturated carboxylic acids, and other ethylenically unsaturated monomers are known in the art, e.g., see U.S. Pat. No. 3,247,139 issued Apr. 19, 1966, and Example XV of U.S. Pat No. 3,079,434, issued Feb. 26, 1963. However, the water-based coating compositions of the aforementioned patents differ materially in composition from the compositions of this invention in that the compositions therein do not contain a polyol component and a formaldehyde condensation resin. Moreover, while the compositions of these patents are useful in certain applications, they have been found to exhibit a number of serious disadvantages which materially limit their usefulness. Thus, the compositions of the aforementioned patents and, for that matter, water-based coatings in general, have been found to be very susceptible to solvent or water popping and sagging, or "curtaining", particularly when relatively thick films are deposited therefrom. Solvent or water popping manifests itself in the form of bubbles or pinholes in the cured film surface.

The exact cause of solvent or water popping is not known with certitude, but it has been theorized that the film sets up structurally, or actually begins to crosslink before the last portion of the solvent or water is eliminated. This residual solvent or water cannot evaporate through the tough surface film, and collects in tiny bubbles which may or may not rupture, depending upon the curing conditions.

Another theory is that as the resin cures, the water and/or alkanol given off during the crosslinking cure process is actually entrained under the film surface in the form of tiny bubbles.

Sagging or "curtaining" occurs when relatively thick films of the coating composition are applied to other than horizontal surfaces and is due to gravitational flow of the film, and/or to film resoftening during the curing period. In the coatings art, the term "sagging" denotes the tendency of a film to drain or flow from a non-horizontal surface in an uneven manner, while the term "curtaining" denotes the tendency of the film to drain or flow from said surface in a smooth, continuous manner.

Water-based coating compositions such as those described in the aforementioned patent also exhibit additional disadvantages. Thus, such compositions have been found to have inadequate moisture and detergent resistance for certain coating applications, such as, for example, coatings for washers, dryers and the like.

Very recently, water-based coating compositions comprising methylolated amide interpolymers of high acid content and low molecular weight polyhydric alcohols have been disclosed in U.S. Pat. No. 3,860,549 to Sekmakas, issued Jan. 14, 1975. However, the compositions of the aforementioned patent are specific to interpolymers derived from unetherified methylolated amides and do not contain aldehyde condensation resins, and thus differ materially from the compositions of the invention herein. The compositions of the aforementioned patent also exhibit serious disadvantages. Thus, compositions based upon methylolated amide interpolymers tend to exhibit short potlife and be prone to gelation. Additionally, compositions of the type described in Sekmakas also exhibit inadequate moisture and detergent resistance in certain coating applications, such as, for example, coatings for washers, dryers and the like.

In accordance with this invention, a water-based coating composition is provided which overcomes substantially all of the disadvantages referred to above. Thus, the water-based coating composition of the invention is one in which solvent popping or water popping and sagging is eliminated or at least substantially reduced. Moreover, the compositions of the invention are based upon etherified amide interpolymers (discussed below) and hence have excellent stability. Finally, the compositions of the invention form films having improved water, salt spray, detergent and stain resistance.

DESCRIPTION OF THE INVENTION

The water-based coating compositions of the invention comprise a thermosetting, film-forming organic binder dispersed in an aqueous medium containing from 60 to 100 parts by weight of water and 0 to 40 parts by weight of a volatile organic solvent. The water-reducible organic binder of the composition is formulated from (A) an acid-containing interpolymer adapted to be dissolved or dispersed in water with the aid of a base; (B) a water-soluble or water-dispersible polyether polyol or polyester polyol having a molecular weight of at least about 300; and (C) a water-soluble or water-dispersible aldehyde condensation resin.

A. THE ACID-CONTAINING INTERPOLYMER COMPONENT

The interpolymer component utilized in the binder of the compositions of the invention consists essentially of the interpolymerization product of a carboxylic acid amide, an alpha, beta-ethylenically unsaturated carboxylic acid and contains units of the structure:

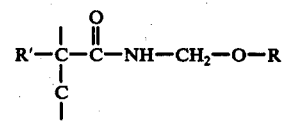

wherein R′ is hydrogen or lower alkyl and R is lower alkyl.

The units represented by the above structural formula are units of a substituted polymerized amide. These substituted amides or the polymerized units thereof can be prepared before, during or after polymerization.

Thus, the substituted amide can be prepared prior to polymerization by reacting an unsaturated amide (e.g., acrylamide) with formaldehyde or other aldehyde and an alkanol (e.g., butanol) under acidic conditions and in the presence of a polymerization inhibitor. For a detailed description of this method, see U.S. Pat. No. 3,079,434, incorporated herein by reference. The resultant N-alkoxyalkyl-substituted amide [e.g., N-(butoxymethyl)acrylamide] is then interpolymerized with the other monomers (described below) to form the interpolymer containing the substituted amide units.

Alternatively, the substituted amide units can be found in the interpolymer after polymerization by first interpolymerizing an unsubstituted unsaturated carboxylic acid amide such as acrylamide or methacrylamide with the other monomers and then reacting the resulting interpolymer with an aldehyde such as formaldehyde to form the aldehyde-modified interpolymer, following which etherification is carried out by further reaction of the aldehyde-modified interpolymer with an alkanol such as butanol. For a more detailed discussion of this reaction, see U.S. Pat. No. 3,037,963, incorporated herein by reference.

When it is desired to form the interpolymer by utilizing an unsubstituted amide as the starting material, acrylamide or methacrylamide are preferred, although other unsaturated carboxylic acid amides such as crotonamide, the mono- or diamide of itaconic acid or fumaric acid, and the like may also be employed. Formaldehyde is the preferred alkylolating aldehyde but others such as butaldehyde may also be used. Lower alkanols (i.e., alkanols having from 1 to 6 carbon atoms) and especially n-Butanol are the preferred etherifying alcohols.

When it is desired to form the interpolymer by utilizing an N-alkoxyalkyl-substituted amide as the starting material, the preferred N-alkoxyalkyl-substituted amide is N(butoxymethyl)acrylamide, although other N-alkoxyalkyl-substituted amides such as N-(methoxymethyl)acrylamide, N-(propoxymethyl)acrylamide, N-(isopropoxymethyl)acrylamide, N-(isobutoxymethyl)acrylamide, and N-(butoxymethyl)methacrylamide, or the like may also be employed.

The interpolymer may contain from about 10 to about 40 percent of these N-alkoxyalkyl-substituted amide units with a preferred range being from about 20 to about 30 percent.

Ethylenically unsaturated carboxylic acid monomers which are preferably utilized in forming the acid units of the interpolymer include acrylic or methacrylic acid, but itaconic acid, crotonic acid, maleic acid and half esters of maleic and fumaric acids may also be used. In the half esters, one of the carboxyl groups is esterified with an alcohol, the identity of which is not significant so long as it does not prevent polymerization or preclude the desired utilization of the product. Butyl hydrogen maleate and ethyl hydrogen maleate are examples.

The interpolymer may contain in polymerized form from about 5 to about 20 percent by weight of such acid units. However, for greater efficiency in solubilization and overall properties, it is preferred that from 7 to 15 percent of such acid units be present in the interpolymer.

As indicated, the interpolymer, in addition to the substituted amide and acid units, contains units of at least one other monomer containing a $CH_2=C<$ group. The other monomer containing the $CH_2=C<$ group can be any ethylenically unsaturated compound which is copolymerizable with the substituted amide and acid with the polymerization taking place through the ethylenically unsaturated linkages. These include monoolefinic and diolefinic hydrocarbons, unsaturated esters of organic and inorganic acids, esters of unsaturated acids and unsaturated organonitriles such as acrylonitrile and the like. It is preferred, in order to provide desirable properties in the interpolymer, to utilize a combination of hardening and flexibilizing monomers. The preferred hardening monomer is styrene, but others such as vinyl toluene or alkyl methacrylates having from 1 to 4 carbon atoms can also be utilized.

The interpolymer may contain in polymerized form from about 5 percent to about 75 percent by weight of hardening monomers with a preferred range being from about 50 to about 60 percent of such monomers.

The flexibilizing monomers utilized may be one or more alkyl or substituted alkyl esters of acrylic or methacrylic acid, the alkyl groups having 1 to 13 carbon atoms in the case of acrylic esters and 5 to 16 carbon atoms in the case of methacrylic esters. Illustrative of such flexibilizing monomers are ethyl acrylate, butyl acrylate, 2-ethylhexyl acrylate, 2-ethylhexyl methacrylate, decyl methacrylate, lauryl methacrylate, and the like.

The interpolymer may contain, in polymerized form, from about 5 percent to about 75 percent by weight of such flexibilizing monomers with a preferred range being from about 20 percent to about 50 percent.

The above-described acid-containing interpolymer is prepared by conventional vinyl polymerization techniques utilizing vinyl polymerization catalysts which are well known in the art. These include the azo compounds such as alpha, alpha'-azobis(isobutyronitrile), which are the preferred catalysts herein, and the well known peroxygen catalysts such as benzoyl peroxide, lauroyl peroxide, cumene hydroperoxide and the like. Other useful catalysts include tertiary-butyl perbenzoate, tertiary-butyl pivalate, isopropyl percarbonate and similar compounds. In addition, the interpolymer may be prepared, if desired, by conventional emulsion polymerization techniques. In that event, it is often desirable and preferred to employ water-soluble initiators such as hydrogen peroxide, ammonium persulfate, potassium persulfate and other similar persulfates.

As indicated, the above-described acid-containing interpolymer is adapted to be dissolved or dispersed in an aqueous medium with the aid of a base. This is accomplished by neutralizing all or a portion of the carboxylic acid groups of the interpolymer with an appropriate base. Virtually any basic compound can be utilized for that purpose, including inorganic bases such as alkali metal hydroxides and organic bases such as amines. However, the preferred basic compounds utilized herein are the monomeric amines. These may be any of the amines used for solubilizing purposes known heretofore, including ammonia, ethylamine, butylamine, dimethylamine, cyclohexylamine, morpholine, monoethanolamine, diethanolamine, dimethylethanolamine, diethylethanolamine and the like. Of these amines, dimethylethanolamine is preferred.

The amount of amine employed in neutralizing the acid groups of the interpolymer may vary considerably. However, it is preferred in this invention that the amount of amine employed be sufficient to neutralize at least about 40 percent of the theoretical quantity of acid groups present in the interpolymer.

Several procedures may be employed in dispersing the interpolymer in the aqueous medium. One known method is to first form the interpolymer in solution by polymerizing the monomers in a water-miscible volatile organic solvent or mixture of such solvents, following which the acid groups of the resultant interpolymer are neutralized with the basic compound, if desired, in the presence of water, to form the salt or partial salt of the interpolymer, thus enabling the interpolymer to be dissolved or dispersed in the aqueous medium. In this method, any excess organic solvent utilized in the polymerization process can be removed from the aqueous medium by distillation if desired. Alternatively, in the practice of this invention, the monomers can first be polymerized in a mixture of a water-miscible volatile organic solvent and the water-soluble or water-dispersible polyether or polyester polyols (described hereinafter) or in the water-soluble or water-dispersible polyether or polyester polyol alone, following which the acid groups of the resultant interpolymer are neutralized to form the salt or partial salt of the interpolymer, thereby rendering the interpolymer dissolvable or dispersible in the aqueous medium. These alternative procedures have the advantage of eliminating the necessity for a separate distillation step to remove any excess organic solvent.

Various water-miscible or water-soluble organic solvents can suitably be employed in producing the water-soluble or water-dispersible interpolymer. Thus, the ether type alcohols such as ethylene glycol monobutyl ether (i.e., butyl Cellosolve), ethylene glycol monoethyl ether (i.e., ethyl Cellosolve), diethylene glycol monomethyl ether, diethylene glycol n-butyl ether (i.e., butyl Carbitol) and the like may be advantageously employed. In addition, lower alkanols having 2 to 4 carbon atoms such as ethanol, propanol, isopropanol, butanol and the like can be used. Mixtures of the ether type alcohols and lower alkanols are often advantageously employed. Minor proportions of hydrocarbon solvents such as xylene, toluene and the like may also be included.

The liquid portion of the coating compositions herein may contain from about 60 to about 100 percent by weight of water and correspondingly from 0 to about 40 percent by weight of organic solvents, such as those mentioned above, with a preferred ratio being from 80 to 90 percent by weight of water and 10 to 20 percent by weight of organic solvent. In any case, at least about 60 percent by weight of the liquid medium will be water.

B. THE WATER-SOLUBLE OR WATER-DISPERSIBLE POLYOL COMPONENT

As indicated above, in addition to the previously-described interpolymers, the organic binder of the water-based coating compositions of the invention contains a non-volatile, water-soluble or water-dispersible polyether polyol or polyester polyol and a water-soluble or water-dispersible aldehyde condensation resin.

Polyether polyols or polyester polyols which can suitably be employed in the binder of the compositions of this invention are those having a molecular weight of at least 300 and which are soluble or dispersible in water. These polyols must have molecular weights of at least 300 and may have molecular weights of up to 5000 or even higher, provided they are water-soluble or water-dispersible. The preferred water soluble or water-dispersible polyether polyols or polyester polyols employed in the compositions of the invention are those having molecular weights of from about 500 to about 3,000. As further stated, the polyols employed must be non-volatile. The term "non-volatile" as applied to the polyols herein means that under the curing conditions utilized, not more than 5 percent of the polyol will volatilize, (i.e., evaporate) from the film, before the film is cured.

Subject to the above limitations, essentially any polyether polyol or polyester polyol can be employed in the compositions of the invention, with the preferred polyols being polyester polyols which are the reaction products of an alkylene oxide, preferable ethylene oxide or 1,2-propylene oxide, with a polyol such as glycerine, trimethylolpropane, hexanetriol, pentaerythritol, sorbitol, sucrose or the like. The particularly-preferred polyether polyols used in the invention are the reaction products of 1,2-propylene oxide with a mono- or disaccharide such as sucrose, dextrose, lactose and alpha-methyl d-glucoside.

Polyethers of mono- and disaccharides are known in the art. One preferred method of preparing these sugar-containing polyether polyols (e.g., sucrose polyether polyol) is to first dissolve the saccharide in water, following which an oxyalkylation catalyst is added, and the alkylene oxide addition is carried out to that point at which the saccharide-alkylene oxide reaction product is a liquid at room temperature. At this point, substantially all of the water present is removed by distillation or other means, and the balance of the alkylene oxide is added until the desired polyether polyol is obtained. For a detailed description of these saccharide-containing polyether polyols and their method of preparation, see U.S. Pat. No. 3,085,085, issued Apr. 9, 1963.

Polyester polyols which are suitable for use in the instant invention are formed from the polyesterification of organic polyols and organic polycarboxylic acids or acid anhydrides. The polyols and polycarboxylic acids or anhydrides are often aliphatic or aromatic diols and diacids but it is advantageous in some cases to employ polyols or polycarboxylic acids having hydroxyl or carboxyl functionalities of 3 or more.

The preferred polyols employed in forming the polyesters and diols and triols.

Diols which may be employed in making the polyester polyol include alkylene glycols such as ethylene glycol, propylene glycol, butylene glycol, hexylene glycol, and neopentyl glycol and other glycols such as hydrogenated Bisphenol A, cyclohexane dimethanol, caprolactone diol (for example the reaction product of caprolactone and ethylene glycol), hydroxyalkylated bisphenols, and polyether glycols such as poly(oxytetramethylene) glycol and the like. In addition, many other diols of various types can be utilized.

Triols which are preferably employed in making the polyester polyols include compounds such as trimethylolpropane, trimethylolethane, 1,2,2-propanetriol, 1,2,4-butanetriol, polycaprolactone triols and triols based on adducts of propylene oxide and glycerine.

Polycarboxylic acids which may be employed in making the polyester polyol consist primarily of monomeric carboxylic acids or anhydrides having 2 to 14 carbon atoms per molecule. Among the acids which are useful are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, and other dicarboxylic acids of varying types.

The polyester may include minor amounts of monobasic acids, such as benzoic acid, and there may also be employed herein polycarboxylic acids such as trimellitic acid and tricarballylic acid (where acids are referred to above, it is understood that the anhydrides of those acids which form anhydrides can be used in place of the acid.) It is preferred that the polyester include an aliphatic dicarboxylic acid as at least part of the acid component. It should be noted that if both tricarboxylic acids and triols are used in the same polyester, care must be exercised else gelation will occur and the polyester will be so highly crosslinked that it will not be water soluble or water dispersible. In general, high contents of triols rather than the tricarboxylic acids are favored.

The polyester polyols useful herein also include polyester amide polyols, and polyhydric compounds having polyester structures but not formed from the reaction of a polyol and a polycarboxylic acid. Examples of this latter type includes the so-called lactone polyesters, such as the polycaprolactone polyols described in U.S. Pat. No. 3,169,945 to Hostettler et al.

The polyether or polyester polyols used in the water-based coating compositions of this invention provide a number of advantages thereto. First, these polyols participate in the curing of the compositions by being cross-linked by the aldehyde condensation resin (described below) through their hydroxyl functionality. Therefore, these polyols are incorporated into the film formed by curing the composition. More importantly, the use of these polyols in the compositions of the invention produces water-based coatings in which solvent and water-popping and sagging are eliminated or substantially reduced. This is of great importance since solvent and water-popping and sagging have been serious problems with water-based coatings prior to the instant invention.

The amounts of these polyether or polyester polyols which are ordinarily included in the binder of the compositions of the invention vary considerably depending upon the thickness of the coating desired, humidity conditions and the like. In general, from about 5 percent to about 40 percent by weight of the polyol based upon total binder solids may be included with a preferred amount being from 10 percent to 25 percent.

C. THE WATER-SOLUBLE OR WATER-DISPERSIBLE ALDEHYDE CONDENSATION RESIN COMPONENT

In addition to the above-described interpolymers and polyols, the organic binder of the water-based coating compositions of the invention contains a water-soluble or water-dispersible aldehyde condensation resin.

Water-soluble or dispersible aldehyde condensation resins which may be employed include the water-soluble or dispersible condensation products of an aldehyde, particularly formaldehyde, with an amino- or amido-group containing compound such as urea, melamine, benzoguanamine and the like, including the transethers thereof with methanol, butanol or other lower alcohol (i.e., aminoplast resins) are water-soluble or dispersible condensation products of an aldehyde with a phenolic resin.

Illustrative of water-soluble or dispersible aminoplast resins which may be employed are alkylated melamine formaldehydes such as methylated melamine formaldehyde, butylated melamine formaldehyde and the like; alkylated urea formaldehydes such as methylated urea formaldehyde, butylated urea formaldehyde and the like; urea formaldehyde; benzoguanamine formaldehyde; hexa(methoxymethyl)melamine; hexakis(methoxymethyl)melamine and similar compounds. Of these compounds, hexa(methoxymethyl)melamine is the preferred compound.

While the aldehyde employed in forming the water-soluble or dispersible aminoplast resin is most often formaldehyde, other similar condensation products can be made from other aldehydes or mixtures thereof, such as acetaldehyde, crotonaldehyde, acrolein, benzaldehyde, furfural, glyoxal and the like.

As indicated, the water soluble or dispersible aldehyde condensation resin may also be a water soluble or dispersible phenolic resin (i.e., phenol-aldehyde resin). As in the case of the aminoplast resins, the most commonly used aldehyde is formaldehyde, although other aldehydes, such as acetaldehyde, can also be employed. Methylene-releasing and aldehyde releasing agents, such as paraformaldehyde and hexamethylene tetramine, can also be utilized as the aldehyde if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols such as the monobutenyl phenols containing a butenyl group in the ortho, meta or para position, and where the double bond occurs in various positions in the hydrocarbon chain. Illustrative of such compounds are the well known non-gelled alkaline condensates of phenol with excess formaldehyde known as "A" stage resole.

While water-soluble or dispersible phenol aldehyde resins of the type mentioned above may be employed in the invention, the preferred phenolic resins for use in the binder of the compositions of the invention are the methylolphenol ethers of the structure:

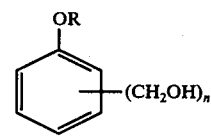

when $n$ is an integer of from 1 to 3 and R is an unsaturated aliphatic group or a halogen-substituted aliphatic group. The groups represented by R should contain at least 3 carbon atoms and can be allyl groups (which are preferred) or others such as methallyl, crotyl, butenyl and the like. The halogen-substituted unsaturated groups represented by R can be various mono- and poly-halogenated derivatives of the above unsaturated aliphatic groups, for example, 2-chloro-allyl, 3-chloro-allyl, 3-chloro-2 methallyl, 1-chloro-2-butenyl and corresponding groups containing halogens such as bromine or fluorine.

The methylol phenol ethers which may be employed herein are described in U.S. Pat. No. 2,579,330 and, as described therein, can be produced from sodium or barium salts of 2,4,6-tris(hydroxymethyl)phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and meta positions). The trimethylolated derivative is generally the predominant component of the composition. Such commercially available methylol ether compositions are especially preferred for use in the invention.

While any of the above-described aldehyde condensation resins can be utilized singly in the compositions of the invention, it is often advantageous in obtaining desired physical and chemical properties to employ mixtures of such resins. Thus, for example, the utilization in the coating composition of a mixture of water-soluble or dispersible aldehyde condensation resins comprising an aminoplast resin and a methylol phenol ether of the type described above significantly improves the detergent resistance of a film formed from the coating composition.

Water-soluble or dispersible aldehyde condensation resins may be included in the organic binder of the composition of the invention in amounts ranging from 5 percent to about 40 percent, preferably 5 to 20 percent by weight based on total binder solids.

In addition to the thermosetting film-forming organic binder and the aqueous medium, the water-based coating compositions of this invention may contain various additives commonly utilized in the coatings industry. Thus, these compositions may contain conventional pigments such as titanium dioxide, aluminum, silica, lead silica chromate, carbon black, talc, barium sulfate and the like. Colored pigments such as cadmium red, cadmium yellow, phthalocyanine blue, phthalocyanine green, chrome green, toluidine red, hydrated iron oxide, and the like may be included if desired. Also, other adjuvants may be incorporated, such as dispersing agents, surface-active agents, adhesion promoting agents, melting agents, flow agents, antioxidants, and the like.

The water-based coating compositions of the invention can be applied by methods conventionally employed in the coatings industry, such as brushing, dipping, flow coating, roll coating, spraying and the like.

After application, the compositions are ordinarily dried and cured by baking at elevated temperatures to produce a hard, thermoset film. The precise baking schedule will depend upon the particular composition utilized, the nature of the substrate, thickness of the coating and the like. However, it should be observed that the baking temperature employed must not be so high as to volatilize the polyol component before it can be crosslinked into the film. Thus, the baking temperature usually should not exceed about 500° F. unless for very short periods. The normal curing time may conveniently range from 5 to 45 minutes for usual industrial situations. In coil coating applications, baking schedules of short times and high temperatures can be used.

The water based coating compositions of the invention may have solids contents ranging from 25 to 70 percent by weight. Solids include the interpolymer, polyol, aldehyde condensation resin and any desired pigmentation.

The following examples set forth specific embodiments of the instant invention. However, the invention is not to be construed as being limited to these embodiments for there are, of course, numerous possible variations and modifications. All parts and percentages in the Examples as well as throughout the specification are by weight unless otherwise indicated.

EXAMPLE A

This example illustrates the preparation of an aqueous dispersion of an amide type interpolymer employed in the compositions of this invention.

To a reactor equipped with reflux condenser, heating means, stirrer, thermometer and nitrogen inlet were charged 130.0 grams of ethylene glycol monoethyl ether (hereinafter ethyl Cellosolve) and 325.0 grams of a feed mixture consisting of 58.6 percent styrene, 15.0 percent methyl methacrylate, 6.7 percent acrylic acid, 19.7 percent N-(butoxymethyl)acrylamide and 3.0 percent tertiary dodecyl mercaptan. The charged matter was then heated under nitrogen to reflux (about 125° C.). After reflux had begun, an additional 1063.0 grams of the above feed mixture and 12.0 grams of alpha, alpha'-azobis(isobutyronitrile) were added to the reactor over a period of 3 hours. Following this addition, a total of 5.1 grams of tertiary butyl perbenzoate and 22.5 grams of ethyl Cellosolve were added to the reactor in 3 equal increments (i.e., 1.7 grams of tertiary butyl perbenzoate and 7.5 grams of ethyl Cellosolve) over a period of about 5 hours with the first two increments being added at 1.5 hour intervals. At the end of this period, the reactor was cooled to room temperature. After approximately one hour, the reaction mixture was heated to approximately 96° C. and 39.9 grams of dimethylethanolamine was added to the reactor. After this addition heating was continued until a temperature of 108° C. was attained and then 12.0 grams of one percent Triton X-100 a non-ionic, alkarylethoxyethanol surfactant, was added to the reactor. Following the addition of the surfactant, 1845.0 grams of deionized water was added to the reaction mixture.

The resultant amide interpolymer dispersion had a total solids content of 34.7 percent, an acid value of 15.7 and a viscosity of 1850 centipoises. The aqueous medium consisted of 86.3 percent water and 13.7 percent organic solvents.

EXAMPLE B

This example illustrates an alternative procedure for preparing an aqueous dispersion of amide type interpolymer in which a polyether polyol component is utilized as a portion of the polymerization medium.

To a reactor equipped with reflux condenser, heating means, stirrer, thermometer and nitrogen inlet was charged 300.9 grams of a 100 percent solids sucrose polyether polyol (formed by reacting 1.0 mole of sucrose and 20.5 moles of propylene oxide) having a viscosity of about 6,500 centipoises and an OH value of 325; 137.3 grams of diethylene glycol monomethyl ether (hereinafter DEGMME); 345.0 grams of a feed mixture (hereinafter referred to for convenience as "Feed A") containing, on a monomer solids basis, 58.6 percent styrene, 15.0 percent methyl methacrylate, 6.7 percent acrylic acid, 19.7 percent N-(butoxymethyl)acrylamide, 3.0 percent tertiary dodecyl mercaptan and 1.0 percent alpha, alpha'-azobis(isobutyronitrile); and 6.0 grams of a feed mixture (hereinafter referred to for convenience as "Feed B") containing 25 percent 2-acrylamido-2-methyl propane sulfonic acid, 62.5 percent deionized water, and 12.5 percent dimethylethanolamine. The mixture was heated under nitrogen to about 105° C., at which time an exotherm was observed. Heating and nitrogen flow were then suspended during the period of exotherm. After conclusion of the exotherm, heating under nitrogen was resumed and the mixture was heated to about 130° C. At this point, an additional 1049.0 grams of feed A and 18.0 grams of feed B were added to the reactor over a period of about 3 hours. When this addition was completed, a total of 5.1 grams of tertiary butyl perbenzoate and 15.0 grams of DEGMME were added to the reactor in 3 equal increments (i.e., 1.7 grams of tertiary butyl perbenzoate and 5.0 grams of DEGMME) over a period of about 5 hours with the first and second increments being added at 1.5 hour intervals. Following this addition 46.0 grams of dimethylethanolamine were added to the reactor. Then the reaction mixture was cooled to 75° C. and 2442 grams of deionized water were added to the reactor. The reaction product was then cooled and filtered.

The resultant amide interpolymer-sucrose polyether polyol dispersion had a total solids content of 34.1 percent, a viscosity of 1860 centipoises and an acid value of 13. The aqueous medium consisted of 87.6 percent water and 12.6 percent organic solvents.

EXAMPLES 1-3

These examples illustrate the effect of the polyol and aldehyde condensation resin components on the water-popping and solvent popping characteristics of water-based coating compositions. In these examples a control coating composition (Example 1) was first formulated from the interpolymer dispersion of Example A. Then test compositions were prepared by adding a polyether polyol and an aldehyde condensation resin (in these examples an aminoplast resin) to samples of the control composition.

The control and test compositions were prepared utilizing standard paint mixing techniques. Composition formulations and properties were as follows:

|  | Parts by Weight EXAMPLE NO. | | |
| --- | --- | --- | --- |
|  | 1 | 2 | 3 |
| Ingredients | (Control) | | |
| Interpolymer dispersion of Example A | 146.5 | 97.4 | 86.5 |
| Pigment paste(a) | 113.0 | 113.0 | 113.0 |
| Sucrose polyether polyol(b) | — | 33.8 | 30.0 |
| Hexa(methoxymethyl)melamine | — | 7.5 | 15.0 |
| Total | 259.5 | 251.7 | 244.5 |
| Interpolymer/polyol/aminoplast binder ratio | 100/0/0 | 45/45/10 | 40/40/20 |
| Total solids (percent) | 56.5 | 58.0 | 59.5 |
| Viscosity (seconds) #4 Ford Cup | 18 | 19 | 20 |

(a)A pigment paste consisting of 66.7 percent titanium dioxide, 25.9 percent water, 3.8 percent ethylene glycol, 3.2 percent Triton X-100 alkylarylethoxyethanol surfactant, 0.3 percent NOPCO JMY, an antifoaming agent available from Nopco Chemical Company and 0.1 percent Tamol 731, a pigment wetting agent available from Rohm & Haas Company.
(b)A 100 percent solids sucrose polyether polyol having a viscosity of 6500 centipoises and a hydroxyl value of 325 formed by reacting 1.0 mole of sucrose with 20.5 moles of propylene oxide.

The above compositions were evaluated for sagging characteristics by spray applying samples thereof onto vertical steel panels at a film thickness of 1.2 mils. In evaluating the compositions utilizing this test, the control composition (i.e., Example 1) sagged badly, virtually running off the panel whereas the test compositions (i.e., Examples 2-4) showed no sagging.

The compositions were evaluated for solvent or water popping by spray applying at 80° F. and 50 percent relative humidity samples of the compositions on steel panels, allowing a 5 minute flash period and then baking the panels in an oven for 10 minutes at 300° F. Popping characteristics were measured by determining the dry film thickness which could be obtained without popping. Using this test, the control compositions (i.e. Example 1) could be sprayed to obtain a dry film thickness of 1.6 mils before popping was observed while the test composition could be sprayed to obtain a dry film thickness of 2.2 mils without popping.

EXAMPLE 4

This example illustrates the effect of the polyether polyol and aldehyde condensation resin component on solvent popping and other properties of a coating composition formulated from the interpolymer-polyether polyol dispersion of Example B. The composition was prepared by blending the interpolymer-polyether polyol dispersion of Example B with an aldehyde condensation resin and other desired additives utilizing conventional paint mixing procedure. The composition had the following formulation and properties:

| Ingredient | Parts by Weight |
| --- | --- |
| Interpolymer dispersion of Example B | 425.40 |
| Pigment paste(a) | 570.10 |
| Sucrose Polyether polyol of Examples 2-3 | 56.70 |
| Hexa(methoxymethyl)melamine | 28.40 |
| Total | 1080.60 |
| Interpolymer/polyol/aminoplast binder ratio | 70/20/10 |
| Total solids (%) | 52.4 |
| Spray viscosity (seconds) - #4 Ford cup | 20 |

The above composition was spray applied to steel panels and cured 20 minutes at 325° F. The resultant film was evaluated for various properties with results shown in the Table.

TABLE

| Pencil Hardness | 4H-5H |
| --- | --- |
| Impact (in lb.) | |
| Direct | 50 |
| Reverse | 10 |
| Initial Gloss | |
| 20° | 23 |
| 60° | 79 |
| R. T. Water Immersion (Hours) | 500 |
| Humidity Resistance (120° F.) | 500 |
| Salt spray 5% NaCl (Hours) | 336 |
| Solvent or Water Popping - 5 minute flash | |
| (Dry film thickness without popping) | 2.3 mils |

As the above examples illustrate, the incorporation of the polyol and aldehyde condensation resin components in the binder of the compositions of the invention dramatically improves resistance to water-popping, solvent-popping, and sagging permitting the application of thicker films and also provides films having excellent water, humidity, and salt spray resistance.

Similar results to those shown in the examples may be obtained by using other interpolymers of the type described in the specification in place of those utilized in the examples. Thus, for example, an interpolymer derived from N-(butoxymethyl)methacrylamide, methacrylic acid, acrylonitrile, butyl methacrylate, and ethyl acrylate may be utilized. Additionally, various other water-soluble or water-dispersible polyether or polyester polyols of the type described may be substituted for the sucrose polyether polyol utilized in the examples. For example, a polycaprolactone polyol having a molecular weight of about 530 formed by reacting 1.0 moles of diethylene glycol with 3.7 moles of epsilon-caprolactone may be employed. Further, varios other aldehyde condensation resins and mixtures of such resins of the type described may be substituted for the hexa(methoxymethyl) melamine utilized in the examples. For example a mixture of a methylolated melamine formaldehyde resin and a methylol phenol ether may be utilized.

According to the provisions of the patent satutes, there are described above the invention and what are now considered to be its best embodiments. However, it is to be understood that within the scope of the appended claims the invention may be practiced otherwise than specifically described.

We claim:

1. A water-based coating composition having reduced solvent popping, water-popping and sagging characteristics comprising a thermosetting, film-forming organic binder dispersed in an aqueous medium containing at least 60 percent by weight of water, said organic binder consisting essentially of:

A. an interpolymer consisting essentially of:
   1. from about 10 percent to about 40 percent of a carboxylic acid amide in units of the structure:

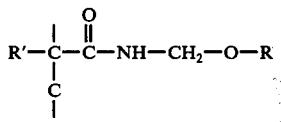

wherein R' is hydrogen or lower alkyl and R is lower alkyl;
   2. from about 5 to about 20 percent of units of an alpha, beta-ethylenically unsaturated carboxylic acid, and
   3. units of at least one other ethylenically unsaturated monomer containing a $CH_2 = C<$ group, wherein said interpolymer is solubilized by neutralizing at least part of the carboxylic acid groups with a base;

B. from about 5 percent to about 40 percent by weight of binder solids of a non-volatile water-soluble or water-dispersible polyether polyol or polyester polyol having a molecular weight of at least 300; and C. from about 5 percent to about 40 percent by weight of binder solids of a water soluble or water-dispersible aldehyde condensation resin.

2. The water-based coating composition of claim 1 wherein said amide is N-(butoxymethyl)acrylamide or N-(butoxymethyl)methacrylamide.

3. The water-based coating composition of claim 1 wherein said alpha, beta-ethylenically unsaturated carboxylic acid is acrylic acid or methacrylic acid.

4. The water-based coating composition of claim 1 wherein the other monomer containing a $CH_2=C<$ group is a mixture of hardening and flexibilizing monomers.

5. The water-based coating composition of claim 4 wherein the hardening monomer is styrene, vinyl toluene or an alkyl methacrylate having from 1 to 4 carbon atoms.

6. The water-based coating composition of claim 4 wherein the flexibilizing monomer is one or more alkyl or substituted alkyl esters of acrylic or methacrylic acid, wherein the alkyl or substituted alkyl groups have 1 to 13 carbon atoms in the case of acrylic esters and 5 to 16 carbon atoms in the case of methacrylic esters.

7. The water-based coating composition of claim 1 wherein said base is a monomeric amine.

8. The water-based coating composition of claim 1 wherein said base is dimethylethanolamine.

9. The water-base coating composition of claim 1 wherein said polyether polyol is a sucrose polyether polyol.

10. The water-based coating composition of claim 1 wherein said aldehyde condensation resin is hexa(methoxymethyl)melamine.

11. The water-based coating composition of claim 1 wherein said aldehyde condensation resin is a methylolphenol ether having the structure:

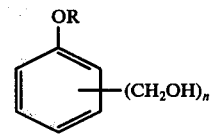

wherein $n$ is a integer of from 1 to 3 and R is an unsaturated aliphatic group or a halogen-substituted unsaturated aliphatic group.

12. The water-based coating composition of claim 1 wherein said aldehyde condensation resin comprises a mixture of a methylolated melamine formaldehyde resin and a methylol phenol ether.

* * * * *